(12) United States Patent
Yehoshua et al.

(10) Patent No.: US 7,734,502 B1
(45) Date of Patent: Jun. 8, 2010

(54) AD SERVER SYSTEM WITH CLICK FRAUD PROTECTION

(75) Inventors: Tamar Yehoshua, Sunnyvale, CA (US); Colin M. Bryar, Seattle, WA (US)

(73) Assignee: A9.Com, Inc., Palo Alto, CA (US)

( * ) Notice: Subject to any disclaimer, the term of this patent is extended or adjusted under 35 U.S.C. 154(b) by 1273 days.

(21) Appl. No.: 11/201,749

(22) Filed: Aug. 11, 2005

(51) Int. Cl.
*G06Q 30/00* (2006.01)

(52) U.S. Cl. .................................... 705/14.47

(58) Field of Classification Search ............ 705/14
See application file for complete search history.

(56) References Cited

U.S. PATENT DOCUMENTS

| | | | |
|---|---|---|---|
| 7,089,735 B1 * | 8/2006 | Qiu et al. ............. | 60/517 |
| 2002/0099600 A1 * | 7/2002 | Merriman et al. ...... | 705/14 |
| 2002/0169760 A1 | 11/2002 | Cheung et al. | |
| 2004/0015397 A1 | 1/2004 | Barry et al. | |
| 2004/0044571 A1 | 3/2004 | Bronnimann et al. | |
| 2004/0230491 A1 | 11/2004 | Messer et al. | |
| 2006/0136294 A1 * | 6/2006 | Linden et al. ......... | 705/14 |

OTHER PUBLICATIONS

SearchEngineWatch.com article titled "Lost Per Click: Search Advertising & Click Fraud," by Jessie Stricchiola, dated Jul. 29, 2004.

Wall Street Journal article titled "In 'Click Fraud,' Web Outfits Have a Costly Problem," by Kevin J. Delaney, dated Apr. 6, 2005.

"BlowSearch Launches Pay-Per-Click Search Engine Advertising Program; Company Introduces New Technologies in Effort to Compete with Google and Yahoo!," dated Mar. 30, 2005, printed from www.newstarget.com/006131.html.

* cited by examiner

*Primary Examiner*—C. M Tarae
*Assistant Examiner*—Saba Dagnew
(74) *Attorney, Agent, or Firm*—Knobbe, Martens, Olson & Bear LLP (57) ABSTRACT

An ad server system takes into consideration information about a user who clicks on an ad in determining whether to charge the advertiser for the click event, and/or in determining an amount to charge the advertiser. In one embodiment, unless the user is recognized, the advertiser is not charged for the ad selection event. Thus, advertisers do not have to pay the ad placement provider when the users who click on their ads are not recognized. If the user is recognized, the ad server system may determine whether and/or how much to charge the advertiser based on information about the recognized user. This information may include, for example, whether the user has set up an account, whether a valid credit card is on file for the user, and/or other types of user information that can be used to hold fraudulent users accountable for their actions.

30 Claims, 4 Drawing Sheets

FIG. 1

① USER COMPUTER REQUESTS WEB PAGE
② AD PUBLISHING SITE DETERMINES WHETHER USER DATA SATISFIES SELECTED CRITERIA
③ AD PUBLISHING SITE REQUESTS AD AND PROVIDES ID STATUS
④ AD SERVER RETURNS AD
⑤ AD PUBLISHING SITE PROVIDES WEB PAGE WITH AD
⑥ USER SELECTS AD
⑦ AD SERVER REDIRECTS BROWSER TO ADVERTISER WEB PAGE
⑧ USER COMPUTER REQUESTS WEB PAGE FROM ADVERTISER SITE
⑨ ADVERTISER SITE RETURNS WEB PAGE
⑩ AD SERVER RECORDS PAY-PER-CLICK CHARGE TO ADVERTISER

FIG. 3

Log out | Your Account

Create Your Listing

54

Your listing will be displayed on pages associated with the following keyword: | Photography |

Bids for clicks

Bid for user that has previously purchased    $ [     ] ~90

Bid for user that has credit card on file    $ [     ] ~92

Bid for user that has registered    $ [     ] ~94

Bid for user that is unknown    $ [     ] ~96

Enter the text of your listing | Upload, distribute and print your photos online. www.ABCPhotos.com |

[ Submit ]

*FIG. 4*

AD SERVER SYSTEM WITH CLICK FRAUD PROTECTION

BACKGROUND OF THE INVENTION

1. Field of the Invention

The present invention relates to ad serving systems of the type that serve ads for display on web pages. More particularly, the invention relates to computer-implemented methods for reducing fraudulent uses of such ad serving systems.

2. Description of the Related Art

Online advertising has seen tremendous growth, and it is now a multi-billion dollar industry. Many companies provide online ad placement services on a "cost per click" (or CPC) basis. With this model, an advertiser pays the provider of an ad placement service a small amount, such as 100, every time a user clicks on an ad. Typically, the ad placement service is capable of serving ads for display on the web pages of a number of different participating web sites. The resulting revenue collected from the advertisers is typically shared between the operators of these participating web sites (referred to as ad "publishers") and the ad placement service provider.

As cost-per-click advertising has increased in popularity, various forms of fraudulent activity or "click fraud" have become common. For example, an unscrupulous entity may repeatedly click on the ads of a competitor in an effort to deplete the competitor's advertising budget. As another example, a web site owner may click on the ads placed on its own web site to generate revenue. In both of these examples, the entity engaging in click fraud may write a program that automates the task of clicking on the ads, or may pay an outside individual to click on the ads.

SUMMARY OF THE INVENTION

The present invention provides an ad server system that takes into consideration information about a user who clicks on an ad in determining whether to charge the advertiser for the click event, and/or in determining an amount of a fee to charge the advertiser. By taking such user information into consideration, the system is capable of significantly reducing charges to the advertisers, and payments to ad publishers, for user actions that constitute click fraud.

In one embodiment, unless the user who clicks on an ad is recognized, the advertiser is not charged for the ad selection event. Thus, advertisers do not have to pay the ad placement provider when the users who click on their ads are not recognized. If the user is recognized, the ad server system may determine whether and/or how much to charge the advertiser based on information about the recognized user. This information may include, for example, whether the user has set up an account, whether a valid credit card is on file for the user, and/or other types of user information that can be used to hold fraudulent users accountable for their actions.

The determination of whether and/or how much to charge the advertiser for an ad selection event may, in some embodiments, be based partially or entirely on user data maintained by the ad placement provider. For example, the ad placement provider (or an affiliate of the ad placement provider) may operate a web site, such as an online shopping site or a subscription-based content site, which provides functionality for users to create online accounts. The user data collected in connection with these user accounts may in turn be used by the ad server system to identify users who click on ads, and to determine whether these users meet pre-specified criteria for charging the advertiser. For example, the advertiser may be charged only if the ad server system receives a browser cookie from the user computer, or only if this cookie is associated with a user account that satisfies particular criteria.

The determination of whether and/or how much to charge the advertiser for an ad selection event may additionally or alternatively be based on user data maintained by the ad publishing site that published the ad. For example, the ad publishing site may maintain its own database of user account information in connection with services provided to customers of the ad publisher. Upon receiving a browser request for a web page on which an ad is to be displayed, the ad publishing site may notify the ad server system of whether the user is recognized, and/or of whether the user meets pre-selected criteria (e.g., has a credit card on file). If the user thereafter clicks on the ad, the ad server system may use the information received from the ad publishing site to determine whether and/or how much to charge the advertiser.

This summary and the following detailed description are directed to certain specific embodiments of the invention. The invention is not limited to the particular embodiments and applications described herein. The invention is defined only by the claims.

DETAILED DESCRIPTION OF SPECIFIC EMBODIMENTS

Specific embodiments of the invention will now be described with reference to the drawings. As will be recognized, the invention is not limited to these particular embodiments. For instance, although described in the context of advertisements displayed on web pages, the invention may also be used in other types of interactive systems that support the display of selectable advertisements, such as interactive television systems.

I. Overview (FIG. 1)

Figure 1:
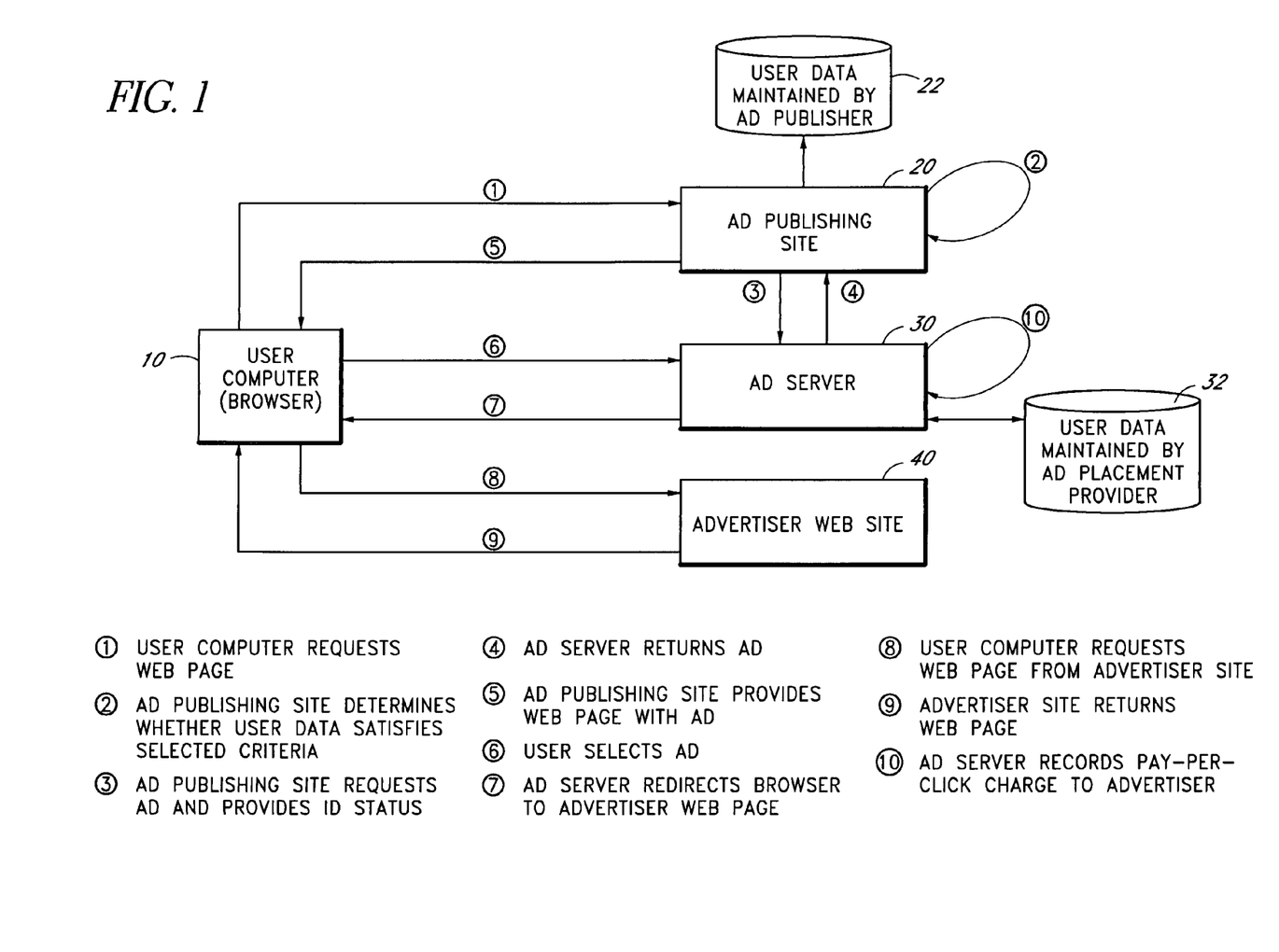
FIG. 1 illustrates the flow of information between a user computer, an ad publishing web site, an ad server and an advertiser web site according to one embodiment of the invention.

FIG. 1 illustrates a user computer 10, an ad publishing web site 20, an ad server 30, and an advertiser web site 40 that participate in ad selection transactions in accordance with one embodiment of the invention. The ad server 30 is part of an ad placement system 50 (shown in FIG. 3 and discussed below) that provides functionality for collecting "sponsored link" type ads from advertisers, serving these ads for display on web pages, and charging advertisers for resulting ad selection events. The primary entity that operates the ad placement system is referred to herein as the "ad placement provider."

Figure 2:
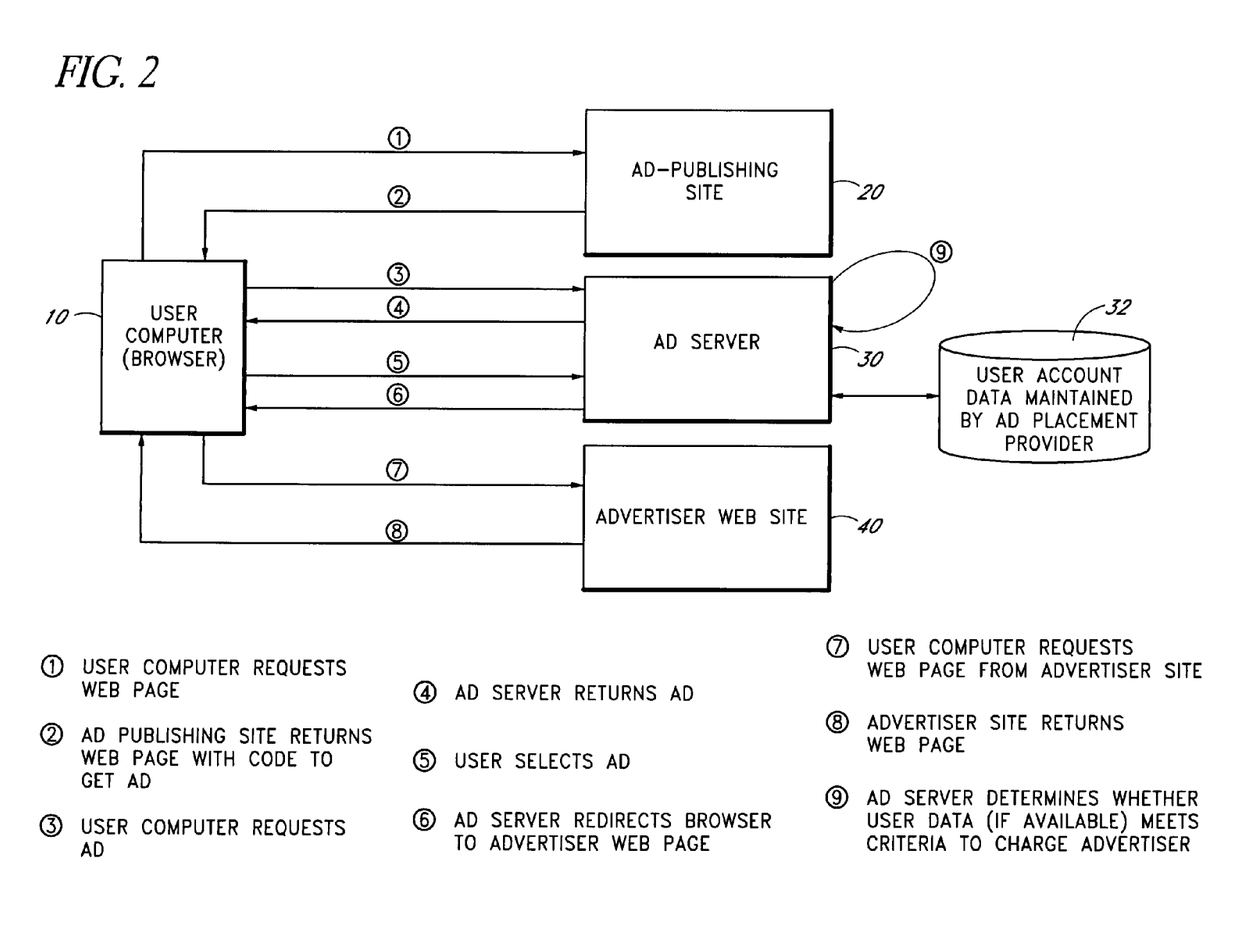
FIG. 2 illustrates the flow of information between a user computer, an ad publishing web site, an ad server and an advertiser web site according to a second embodiment of the invention.

The ad publishing site 20 may be one of many web sites that host or "publish" ads served by the ad server 30 through a business relationship with the ad placement provider. An entity that operates an ad publishing site 20 is referred to herein as an "ad publisher." In the embodiment depicted in FIG. 1, the ad publishing site 20 retrieves the ads from the ad server 30 in response to page requests from user computers 10, and incorporates these ads into the requested web pages. In another embodiment, which is depicted in FIG. 2 and discussed below, the ad server 30 transmits the ads directly to the user computers 10.

The advertiser web site 40 is a web site of an entity (referred to as the "advertiser") that advertises on one or more ad publishing sites 20 via the ad placement system 50. As is known in the art, the advertiser may create one or more ads (also referred to as "sponsored links") via an ad generation interface of the ad placement system, and may specify one or more criteria for controlling how these ads are selected for display. For example, the advertiser may associate a given ad with one or more keywords that are used by the ad server 30 to select ads for display. Each such ad typically includes a link that can be clicked on to access the corresponding advertiser site 40.

The ad server 30, ad publishing site 20, and advertiser site 40 may each be implemented by one or more physical servers. The user computer 10 may be any type of computing device (PC, Personal Digital Assistant, television set-top box, mobile phone, etc.) capable of retrieving and displaying web pages or other types of hypertextual content. The various communications shown in FIG. 1 may occur over the Internet and/or any other type of computer network.

As depicted in FIG. 1, the ad server 30 may access a repository of user data 32, including user account data, for purposes of determining whether to charge the advertiser for an ad selection event. For example, if a user who clicks on an ad is not recognized by the ad server 30, or is recognized but does not meet pre-specified criteria (e.g., has not set up an account, or has not supplied a valid credit card number), the ad server 30 may direct the user to the advertiser site 40 without charging the advertiser. User data retrieved from this repository 32 may additionally or alternatively be used to calculate a monetary amount to be charged to the advertiser for the ad selection event.

The user data stored in the repository 32 may be collected as the result of other online operations of the ad placement provider and/or its affiliates. For example, the ad placement provider may operate one or more web sites for providing services (sales, rentals, subscription-based content, etc.) to web users, or for conducting other types operations that involve the collection of user data. The types of user data that are collected and stored by the ad placement provider—and used to determine pay-per-click charges to advertisers—may vary widely depending upon the type or types of online transactions conducted. For example, in the context of online sales and rentals of items, the user data stored for a given user will typically include a username and password, and email address, a shipping address, credit card or other payment information, and a history of transactions conducted.

The determination of whether and/or how much to charge the advertiser may additionally or alternatively be made based on user data stored in a data repository 22 of the ad publisher. For example, the ad publishing site 20, and/or another web site of the ad publisher, may collect user data in the course of providing services (sales, rentals, subscriptions, etc.) to its customers. This data may be used alone, or in combination with user data maintained by the ad placement provider, to determine the pay-per-click charges to the advertisers. Thus, although the ad server 30 and the ad publishing site 20 are both shown in FIG. 1 as accessing a respective repository 32, 22 of user data, one of these two repositories 32, 22 may be omitted.

In embodiments in which user data maintained by the ad publisher is used to determine pay-per-click charges to advertisers, the ad publishing site 20 may be configured to send cookie files ("cookies") to the computers 10 of some or all users that access the ad publishing site. When a user/browser submits a request to the ad publisher site 20 with a valid cookie, the user is said to be "recognized" by the ad publisher site. In some cases, a recognized user may be "unknown," meaning generally that the cookie is valid but is not associated with a valid user account. The users may additionally or alternatively be recognized via other types of automatically-transmitted identifiers that are now in use or which may be used in the future, including unique browser identifiers and unique CPU identifiers.

In embodiments in which user data maintained by the ad placement provider is used to determine pay-per-click charges to advertisers, one or more web sites of the ad placement provider may similarly store cookies on the computers 10 of users. These one or more web sites may operate in the same Internet domain as the ad server 30 so that the ad server 30 can access these cookies. As with the ad publishing site 20, a user may, in some cases, be recognized by, but unknown to, the ad server 30.

II. Process Flow with Ads Retrieved by Ad Publisher Site (FIG. 1)

The numbered events shown in FIG. 1 represent an embodiment in which the ad publishing site 20 retrieves the ads from the ad server 30 and incorporates these ads into web pages. A second embodiment, in which the ads are retrieved by the user computer 10, is depicted in FIG. 2 and is described in section IV below. Although the events shown in FIG. 1 are numbered sequentially for purposes of explanation, as will be apparent, the events do not necessarily need to be performed in the listed order.

In Event 1, the web browser running on the user computer 10 sends a page request to the ad publishing site 20. The page request may, for example, be an HTTP GET URL request, or may be an HTTP POST request used to submit a search query or other information supplied by the user. If a cookie corresponding to the ad publishing site 20 is stored on the user computer 10, this cookie will ordinarily be transmitted with the page request.

As depicted by Event 2 in FIG. 1, if the page request is accompanied by a cookie, the ad publishing site 20 optionally determines whether the page request is associated with a user or user account that satisfies pre-selected criteria. This step may involve using the received cookie to look up associated user data from the ad publisher's data repository 22, and determining whether this user data satisfies one or more conditions. For example, the ad publishing site 30 may determine whether the received cookie is associated with a valid credit card or bank account, or whether the cookie is associated with an account that is otherwise in good standing.

In Event 3 in FIG. 1, the ad publishing site 20 sends a request to the ad server 30 for one or more ads to be displayed on the requested web page. This request may be accompanied with information about the outcome of the determination, if any, made by the ad publishing site in Event 2. For example, the ad publishing site 20 may notify the ad server 30 of whether the user meets one or more pre-specified criteria for charging advertisers for ad selection events, or may pass to the ad server user information (typically in anonymous form) for making this determination. The information about whether the user meets the pre-specified criteria may alternatively be communicated to the ad server 30 or ad placement provider at some later point in time, such as when the user clicks on the ad, or as part of a periodic batch transmission.

The request for the ad in Event 3 may also include information about the page request received from the user computer 10, such as the URL of the requested page, or if applicable, the search string supplied by the user. This information may be used by the ad server 30 to select one or more appropriate ads to return. The request in Event 3 may also include a unique transaction ID that can be used by both the ad publisher and the ad placement provider for tracking purposes.

In Event 4 of FIG. 1, the ad server 30 selects one or more appropriate ads, and returns the selected ads (typically in the form of HTML content) to the ad publishing site 20 for incorporation into the requested web page. (In some embodiments, the ad server 30 and/or the ad publishing site 20 may alternatively choose not to display any ads if the user is unrecognized.) In selecting the ad or ads to be displayed, the ad server 30 may optionally take into consideration the outcome of the determination made in Event 2. For example, if the user was not recognized by the ad publishing site 20, the ad server 30 may, in some embodiments, only select ads for which the advertiser is charged for ad selections by unrecognized users. Thus, for example, the invention may, but need not, be implemented such that the only users who are directed to a particular advertiser site 40 are those who meet the criteria for charging the advertiser.

The ad server 30 may, at the time of returning the ad in Event 4, determine and record the amount (which may be zero) that will be charged to the advertiser if the user subsequently clicks on the ad. Alternatively, this determination may be made at a later point in time, such as after the user clicks on the ad.

The ad or ads selected and returned in Event 4 may also depend upon the page request information, if any, passed to the ad server 30. For example, if the page request is in the form of a search query submission, the ad server 30 may select one or more ads associated with any keywords included in the search query. If the page request is a request for a relatively static web page of the ad publishing site 20, the ad or ads may be selected based on the content of this web page as previously analyzed by a crawling program.

In Event 5 of FIG. 1, the ad publishing site 20 incorporates the ad(s) into the requested web page, and returns the web page to the user computer 10 for display. For purposes of illustration, it is assumed in this example that only a single ad is included in the web page, and that this ad corresponds to the advertiser web site 40.

In Event 6 in FIG. 1, the user selects the ad, such as by clicking on a link included in the ad, causing the web browser/user computer 10 to send a request to the ad server 30. This request may include an identifier of the advertisement, which may be used to look up the corresponding target URL of the advertiser web site 40. The target URL may alternatively be included in the request message itself. If the user computer 10 has previously accessed a web site of the ad placement provider, the request transmitted in Event 6 may also include a cookie associated with this web site.

In Event 7, the ad server logs the request (including any cookie received with the request), and responds by redirecting the user's web browser 10 to the advertiser site 40. In Events 8 and 9, the browser 10 responds to the redirect command by retrieving a web page from the advertiser site 40. In other embodiments, the ad may point directly to the advertiser site 40 such that a redirect is not necessary; in such embodiments, the web page may, for example, include JavaScript code that causes the browser 10 to notify the ad server 30 of the ad selection event.

In Event 10, which may alternately occur before the web browser 10 is redirected to the advertiser site 40, the ad server 30 records the charge (if any) to the advertiser for the ad selection event. As mentioned above, the determination of whether/how much the advertiser will be charged for the ad selection event may be made either before or after the ad selection event occurs. This determination may be based solely on the outcome of Event 2, as reported by the ad publishing site 20. Additionally or alternatively, the ad server 30 may use a browser cookie received from the user computer 10 in Event 6, together with its own repository 32 of user data, to determine the amount the advertiser is to be charged. This may be accomplished by determining whether the user data associated with the cookie satisfies one or more pre-selected criteria, which may but need not be the same criteria used in Event 2.

The charge to the advertiser may be recorded in an accounting database 46 (FIG. 3) that is ultimately used to collect money from the advertisers, and to pay the corresponding ad publisher, for qualifying pay-per-click events. Although Event 10 is shown as being performed by the ad server 30, the determination of how much to charge the advertiser (and pay the ad publisher) may be made by a separate computer system using information collected by the ad server 30.

The process depicted in FIG. 1 may be implemented in a number of different ways to so as to inhibit click fraud. For example, in one embodiment, the advertisers are only charged for ad selections made by users who are recognized by the ad publishing site 20 and/or the ad server 30. Because users that engage in click fraud are generally less likely to be recognized (e.g., because they commonly disable cookies when engaging in click fraud), advertisers are less likely to be charged for fraudulent ad selection events.

To further reduce click fraud, the process of FIG. 1 may be implemented such that the advertiser is charged only if the stored user data (if any) associated with the cookie satisfies one or more selected criteria. For example, the advertiser may be charged only if user data stored by the ad publishing site 20 and/or the ad server 30 satisfies one or more of the following conditions: (a) a valid credit card is on file for the user; (b) the user has set up an account, and has linked this account to a bank account; (c) the user has supplied an email address or telephone number that has been verified; (d) the user has engaged in a threshold number of financial transactions (purchases, rentals, etc.) in a selected period of time; (e) the domain name portion of the user's email address reveals likely employment by an established organization. The foregoing are merely examples of the types of criteria that may be applied; other criteria that may be used will be apparent to those skilled in the art.

If multiple different types of user data are taken into consideration (such as those listed above), an identity score may be generated to quantify the degree to which the user is known or trusted. The identity score may be generated based on user data maintained by the ad publisher, user data maintained by the ad placement provider, or both. Once generated, the identity score for a user computer 10 may be compared to one or more thresholds to determine whether or how much the advertiser is to be charged.

Even if the user/user computer 10 satisfies the criteria for charging the advertiser, the charge to the advertiser may be blocked if the user has previously engaged in certain conduct, such as conduct reflective of click fraud. For example, the charge to the advertiser may be blocked if either (1) the user has clicked on an ads of this advertiser more than a threshold number of times (e.g., ten) within a selected time period (e.g., one hour); or (2) the user has clicked on ads displayed on pages of this ad publishing web site 20 more than a threshold number of times during the selected time period. To implement this feature, the ad server 30 may keep track of the number of times each recognized user clicks on an ad of a particular advertiser, and the number of times each recognized user clicks on an ad on a particular ad publishing site 20. As another example, the advertiser may not be charged if the user has clicked on any ad of this advertiser in the preceding twenty-four hours.

The process of FIG. 1 may also be implemented such that the amount charged to the advertiser is generally proportional to a level of information available about the recognized user. For example, the advertiser may be charged the full amount if the user has a valid credit card on file; may be charged a lesser amount (e.g., 50% of the full amount) if the user has set up an account but does not have a valid credit card on file, and may be charged an even lesser amount (e.g., 10% of the full amount) if the recognized user has not set up an account. Although three user identification "tiers" are used in this example, any number of tiers may be used.

Referring again to FIG. 1, in some cases, the advertiser may not actually operate its own web site 40, but may instead offer goods or services on a web site operated by the ad placement provider. In such a scenario, the user's web browser may, instead of be redirected to an advertiser site 40, be redirected to an advertiser-specific web page hosted by the ad placement provider. The process may otherwise be the same as in FIG. 1.

III. Example Use Cases

The following examples illustrate some of the ways the invention can be implemented. As a first example, suppose that the ad publishing site 20 is a subscription-based news site associated with a newspaper. Users wishing to access full text news articles on this news site 20 must set up an account with a username and password, and must supply either credit card information or bank account information for payment of a monthly subscription fee. A user account is treated as being in "good standing" if monthly subscription fees have been successfully charged to the user's credit card or withdrawn from the user's bank account for at least the preceding two months.

In this first example, the ad placement provider could offer advertisers an ad placement program in which their ads are contextually displayed on the story pages of the news site 20 on a pay-per-click basis, but in which the advertiser is charged only when the user computer 10 is recognized as being associated with an account that is in good standing. To implement this ad placement program, the news site 20 could be configured with software which determines, and notifies the ad server 30 of, whether a user computer 10 to which an ad is being served is associated with an account that is in good standing. The ad placement program could alternatively be implemented such that the advertiser pays a reduced fee (e.g., 75% off) if the "good standing" criteria is not met.

As a second example, suppose that the ad placement provider operates one or more e-commerce web sites for selling products, hosting online auctions, and/or conducting other types of financial transactions. In this example, a user/user account may be treated as being in good standing if, for example, the user has conducted a financial transaction in the last three months, or if the user has conducted some threshold number or dollar amount of transactions since the inception of the account. As with the first example, the ad placement provider may refrain from charging the advertiser, or may give the advertiser a discount, if the user computer 10 that generates an ad selection event is not recognized as being associated with an account that is in good standing.

The invention is also applicable to ads displayed on a web site operated by the ad placement provider. For example, suppose that the ad placement provider operates a web search engine site, and also offers various subscription-based services that require users to supply credit card information. In this third example, the ad service provider could display keyword-based ads on its web search results pages, in addition to or as an alternative to syndicating these ads for display on the sites 20 of third party publishers. When a user clicks on an ad displayed on a web search results page, the charge to the advertiser may be contingent on whether the user is recognized by, and has a credit card on file with, the ad placement provider.

IV. Process Flow with Ads Retrieved by User Computer (FIG. 2)

FIG. 2 illustrates an alternative process flow in which the ad server 30 delivers the ads directly to users' web browsers. This method may be more appropriate for operators of relatively basic ad publishing web sites 20 since it does not require the creation or installation of any special software on the ad publishing site 20. The methods of FIGS. 1 and 2 can both be used within a given ad placement system 50, with different methods used for different ad publishing sites 20.

In the particular example shown in FIG. 2, the determination of the pay-per-click charge to the advertiser is based solely on user data maintained by the ad placement provider. As discussed below, the method of FIG. 2 can be augmented or modified to take user data maintained by the ad publisher into consideration.

Referring to FIG. 2, the user computer 10 initially requests a web page from the ad publishing site 20 (Event 1). Instead of retrieving an ad from the ad server 30 as in the embodiment of FIG. 1, the ad publishing site 20 responds with a web page (Event 2) that directs the browser running on user computer 10 to request one or more ads (Event 3). For example, the web page may include a code element, such as a URL, a JavaScript sequence, and/or an HTML sequence, which causes the browser to send an ad request message to the ad server 30. The ad publisher may add this code element to those web pages that are to display ads. The ad request message in Event 3 may include information, such as one or more keywords or an identifier of the retrieved web page, that are used by the ad server 30 to select one or more ads to be displayed. The ad server 30 may also use a cookie received with the ad request to personalize the selection of the ad(s) for this particular user. The selected ad or ads are returned in Event 4, and displayed in a designated area of the web page. For purposes of illustration, it is assumed in this example that only a single ad is displayed.

Events 5-8 in FIG. 2 are generally identical to Events 6-9 of FIG. 1. Specifically, upon clicking on the ad, the ad server 30 records the ad selection event (including the received cookie, if any) and redirects the browser 10 to the advertiser web site 40 (or alternatively, to a web page associated with the advertiser but hosted on another entity's web site). Finally, in Event 9, which may be identical to Event 10 of FIG. 1, the ad server 30 determines whether the advertiser should be charged for the ad selection event, and/or determines the amount of the charge. This step may involve using a cookie received in Event 3 or Event 5 to retrieve user data stored in the repository 32, and determining whether this user data satisfies one or more criteria. As in the process flow of FIG. 1, the determination of whether/how the advertiser will be charged for the ad selection event may be made when the ad is served (Event 4), but may be contingent upon the user subsequently clicking on the ad.

As mentioned above, the method shown in FIG. 2 may be modified to take into consideration user data maintained by the ad publisher site 20. This may be accomplished by having the ad publishing site 20 encode information in the ad request coding of the web page delivered in Event 2. This encoded information may, for example, indicate whether the user was recognized, whether ad publishing site has a credit card on file for this user, etc. When the web browser 10 requests the ad in Event 5, this encoded information would be passed to the ad server 10, such that this information may be taken into consideration in determining the pay-per-click fee to the advertiser.

V. Detecting Fraudulent Conduct by Ad Publishers

In embodiments which rely on user data maintained by the ad publisher, the ad publishing site 20 can potentially be fraudulently configured to pass erroneous information to the ad server 30 to the benefit of the ad publisher. For example, the ad publisher could potentially set up its site 20 to treat unrecognized users as recognized, or to treat users who fail to satisfy certain criteria as satisfying such criteria. To protect against this form of fraud, the ad placement provider can conduct periodic ad selection transactions or "test clicks" that do not satisfy the criteria for charging the advertiser. As these transactions are conducted, the user information reported by the ad publishing site 20 to the ad server 30 can be monitored to ensure that the transaction is not mischaracterized.

For instance, suppose that the pay-per-click arrangement specifies that the advertiser will not be charged, and the ad publisher will not be paid, for a transaction in which the user does not have a valid credit card on file with at least one of the ad publisher and the ad placement provider. To test for fraudulent ad publisher activity, the ad placement provider can create a number of "dummy" user accounts on the ad publishing site 20 without supplying any credit card information, and can use these accounts to select ads on pages of the ad publishing site 20. If the ad publishing site 20 erroneously reports that these transactions qualify for pay-per-click payments, the ad placement provider can infer that the ad publisher is engaging in fraudulent activity.

This process of verifying that the ad publishing site is reporting accurate information can be automated via software. For example, a set of agent computers can be programmed to set up accounts on various ad publisher sites 20, to periodically click on ads of these sites, and to report these ad selection events to the ad server 30 for purposes of verification.

VI. Post-Ad-Selection Recognition of User

In some cases, a user may not satisfy the criteria for charging the advertiser at the time the ad is selected, but may satisfy the criteria shortly thereafter. For instance, a user may, at the time of selecting an ad, not yet have an account with either the ad publisher or the ad placement provider. Shortly thereafter, the user may set up an account on the ad publisher site 20 and/or a web site of the ad placement provider, and thus meet the criteria for charging the advertiser. Because the user very likely is not engaging in click fraud in this scenario, the advertiser may, in some embodiments, be charged for the ad selection event even though user/user computer 10 did not satisfy the criteria at the time of the ad selection event.

To implement this feature, the ad publishing site 20 and/or the ad server 30 may be programmed to write a cookie to the unrecognized user computer 10 during sequence of interactions shown in FIG. 1 or 2, such that the user can thereafter be identified by one or both sites as a returning user. If the user returns within a specified time period (e.g., within 24 hours of the ad selection event) and sets up an account, the prior ad selection transaction may be treated as satisfying the criteria for charging the advertiser.

VII. Example System Architecture and Ad Generation UI (FIGS. 3 and 4)

Figure 3:
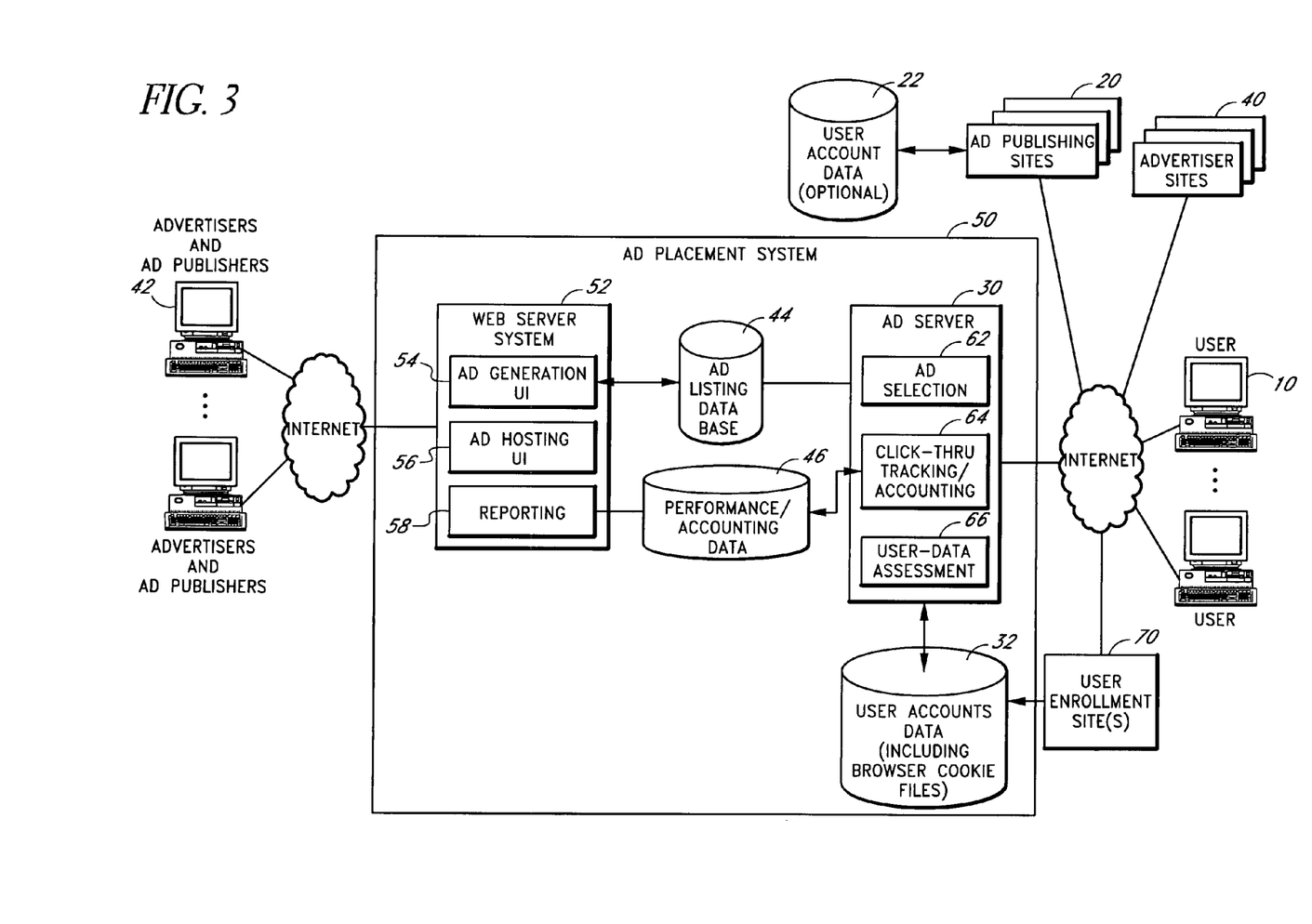
FIG. 3 illustrates an ad placement system according to one embodiment of the invention, and illustrates how the ad placement system interacts with other computer systems.
Figure 4:
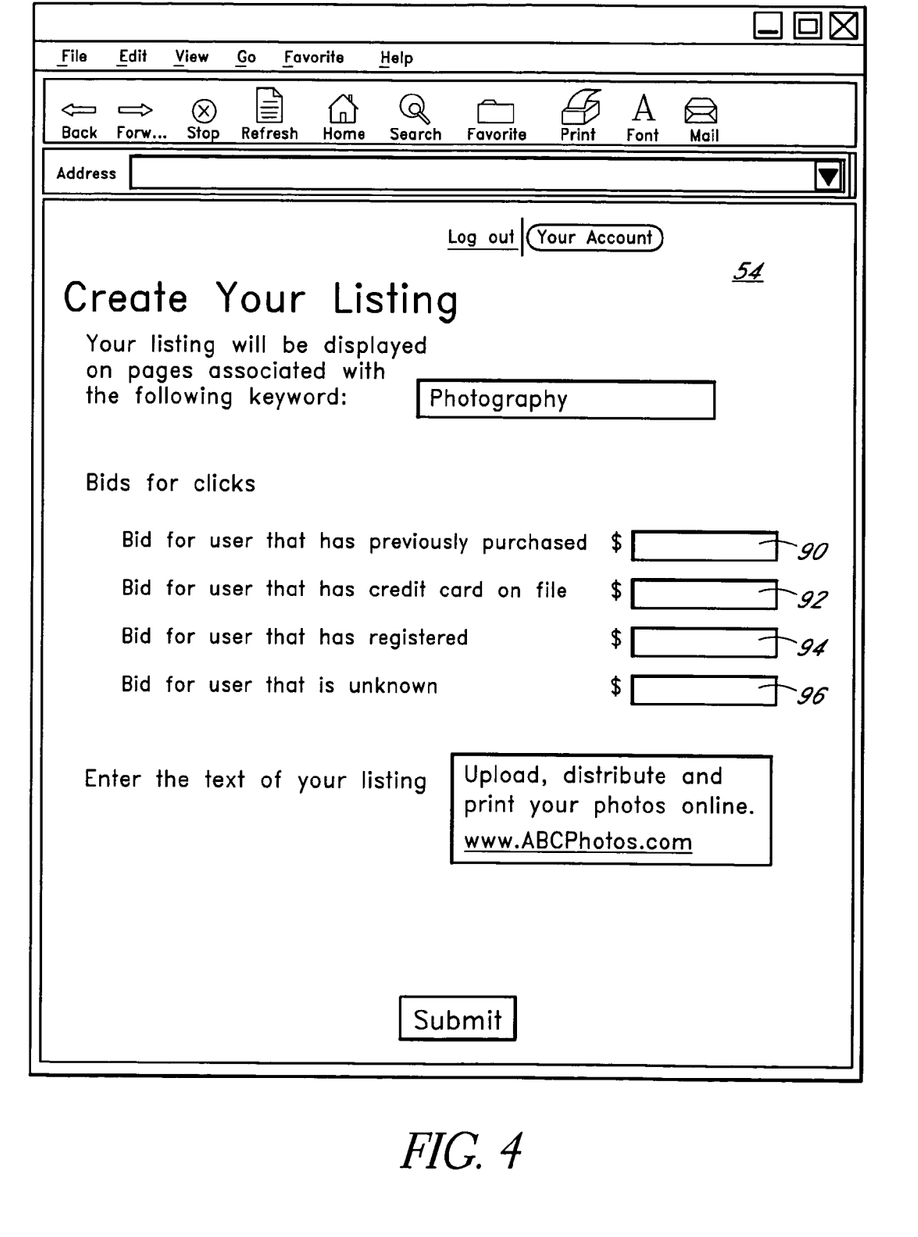
FIG. 4 illustrates a web-based interface that allows an advertiser to place different bids for different classes of users.

FIG. 3 illustrates an ad placement system 50, and associated components, that may be used to implement the methods of FIGS. 1 and 2. The ad placement system 50 includes a web server system 52 that provides a user interface for managing online advertising. The web server system 52 includes an ad generation user interface 54, an ad hosting user interface 56, and a reporting user interface 58, each of which may be implemented as a set of web page templates and associated code modules.

The ad generation interface 54 provides functionality for advertisers to create sponsored-link type ad listings, to specify parameters for controlling the placement of such listings. The parameters specified for a particular ad listing may, for example, include one or more keywords, keyword phrases, topics, URLs, and/or other types of elements used to match ads to web pages. The ad listings are maintained in an ad listing database 44 that is accessed by the ad server 30. Advertisers may access the ad generation interface 54 over a network, such as the Internet, via computers 42 that run web browser software.

The ad generation interface 54 may, in some embodiments, provide an option for the advertiser to specify different bid amounts for different classes of users (e.g., recognized, unrecognized, account holder, customer with credit card, etc.). With this approach, when a user falling in one of the designated user classes clicks on the ad, the fee charged to the advertiser may be equal to, or determined based on, the corresponding bid amount. The bid amounts may also be used to rank ads for display relative to ads from other advertisers.

FIG. 4 illustrates one example of a web page that provides such an option to supply different bids for different classes of users. In this example, input field 90 allows the advertiser to bid on ad placements that result in a click by a user that is known to have previously made a purchase. Similarly, inputs fields 92, 94 and 96 allow the advertiser to bid on ad placements that result in a click by a user that has a credit card on file, has registered, and is unknown, respectively. The bidding interface shown in FIG. 4, can be varied in numerous ways, such as by allowing the advertiser to distinguish between user data maintained by the ad publisher and user data maintained by the ad placement provider, or by allowing the advertiser to bid on a range of values of an identity score.

Rather than specifying multiple bid amounts as in FIG. 4, the advertiser may be prompted to specify a single bid amount per ad or per ad-keyword combination. This bid amount may control the fee charged to the advertiser for ad selections by users meeting one or more published criteria. The advertiser may also be informed that ad selections by all other users are free to the advertiser.

Referring again to FIG. 3, the ad hosting interface 56 provides functionality for a web site operator to enroll as an ad hosting entity or "publisher," and to configure one or more of its web pages to enable ads to be displayed thereon. A publisher can generate revenue by publishing ads together with content such as news, product reviews, tutorials, educational information, or message boards. If the publisher operates an Internet search engine site, the ads may be displayed on search results pages, and may be selected based on search criteria entered by users. The ad hosting interface 56 may provide various options for the publishers to control the types of ads that are displayed on their respective web sites 20. An Application Program Interface (API) for communicating with the ad server 30 may be made available to the ad publishers for purposes of implementing the method of FIG. 1.

The reporting interface 58 provides functionality for reporting the results of ad campaigns. Advertisers may access this interface 58 to evaluate their respective ad campaigns, and ad publishers may use the interface 58 to evaluate their respective ad publishing strategies. The data used by the reporting interface 58 is maintained in a performance/accounting database 46.

The ad server 30 shown in FIG. 3 may operate according to the method of FIG. 1 and/or the method of FIG. 2. The ad server 30 includes an ad selection program module 62 which dynamically selects ads to display on web pages of ad publishing sites 20, as described above. In addition, the ad server 30 includes a click-thru tracking/accounting program module 64 that is responsible for processing ad selection events, and for recording resulting charges in the performance/accounting database 46.

The ad server 30 also includes a user-data assessment program module 66 that is responsible for analyzing user data retrieved from the ad placement provider's user accounts database 32. As illustrated, this database 32 is populated with account data collected by one or more user enrollment web sites 70, such as an online sales site, a DVD rental site, a subscription-based news site, or a social networking site. These user enrollment sites 70 may be operated by the ad placement provider, or by a partner or affiliate of the ad placement provider. The criteria applied by the user-data assessment module 66 to determine whether and/or how much to charge advertisers for ad selection events can vary from one advertiser to another and/or from one ad publisher to another.

The web server system 52 and the ad server 30 can each be implemented using one or more (and typically many) physical servers. The databases 22, 32, 44, 46 depicted in FIG. 3 can be implemented using relational databases, flat files, and/or other types of data repositories.

VIII. Conclusion

As will be recognized, the invention may be embodied in a form that does not provide all of the features, benefits, and implementation details set forth herein. For example, some of the features described above may be omitted, or may be implemented differently than described above. The scope of the invention is defined only by the claims.

What is claimed is:

1. A computer-implemented method, comprising:
receiving, at a server, a request message generated by a web browser running on a user computer, said request message generated in response to an ad selection event in which a user selects an ad presented on a web page of a first web site of a first entity to access a second web site of a second entity, said second web site being a target of the ad; and
programmatically determining whether to charge the second entity a pay-per-click fee for the ad selection event based, at least in part, on whether the user computer is associated with a pre-existing user account created prior to the ad selection event, wherein programmatically determining whether to charge the second entity said pay-per-click fee comprises using a browser cookie received by the server from the user computer to determine whether a payment instrument is on file for said pre-existing user account;

wherein the method is performed by an ad placement system that is separate from the first web site and the second web site, said ad placement system operated by an ad placement entity that is different from the first entity and the second entity, said ad placement system including said server, and the method further comprises responding to the request message by redirecting the browser to the second web site.

2. The method of claim 1, wherein the ad placement system serves ads for display on a plurality of ad publishing sites, and the first web site is one of the ad publishing sites.

3. The method of claim 1, wherein the user account is maintained by the first entity.

4. The method of claim 1, wherein the user account is maintained by the ad placement entity.

5. The method of claim 1, wherein payment instrument is a credit card.

6. The method of claim 1, wherein the step of determining whether to charge the second entity a fee is based, at least in part, on information received by said server from a server of the first web site.

7. The method of claim 1, wherein the step of determining whether to charge the second entity a fee is based, at least in part, on user account information collected by the first web site.

8. The method of claim 1, further comprising using user account information stored in association with the browser cookie received from the user computer to determine a non-zero amount of said fee.

9. The method of claim 1, wherein the step of determining whether to charge the second entity a fee further comprises taking into consideration how many times a user of the user computer has, within a selected time period, selected an ad displayed by the first web site.

10. The method of claim 1, wherein the step of determining whether to charge the second entity a fee further comprises taking into consideration how many times a user of the user computer has, within a selected time period, selected an ad for the second web site.

11. A computer system, comprising:
a computer data repository that stores user account information in association with particular user computing devices; and
a server system that accesses said computer data repository, said server system programmed to perform a method that comprises:
receiving a request message generated by a web browser running on a user computer, said request message generated in response to an ad selection event in which a user selects an ad presented on a web page of a first web site of a first entity to access a second web site of a second entity, said second web site being a target of the ad; and
programmatically determining whether to charge the second entity a pay-per-click fee for the ad selection event based, at least in part, on whether the user computer is associated with a pre-existing user account created prior to the ad selection event, wherein programmatically determining whether to charge the second entity said pay-per-click fee comprises using a browser cookie received by the server system from the user computer to determine whether a payment instrument is on file for said pre-existing user account;

wherein the computer system is separate from the first web site and the second web site.

12. A computer-implemented method, comprising:
by an ad placement system that comprises one or more computers:
receiving, at a server of said ad placement system, a request message generated by a web browser running on a user computer, said request message generated in response to an ad selection event in which a user selects an ad presented on a web page of a first web site of a first entity to access a second web site of a second entity; and
programmatically determining a pay-per-click amount to charge the second entity in connection with the ad selection event such that the amount is dependent upon pre-existing user data associated with the user computer, the user data created prior to the ad selection event, wherein programmatically determining said pay-per-click amount comprises using a browser cookie received by the server from the user computer to determine whether the user computer is associated with a preexisting user account for which a payment instrument is on file;
wherein the ad placement system is separate from the first web site and the second web site, said ad placement system operated by a service provider entity that is different from the first entity and the second entity, said ad placement system including said server.

13. The method of claim 12, further comprising, in response to receiving the request message, redirecting the web browser to the second web site.

14. The method of claim 12, wherein the ad placement system serves ads for display on a plurality of ad publishing sites, and the first web site is one of the ad publishing sites.

15. The method of claim 14, wherein programmatically determining an amount to charge the second entity comprises taking into consideration user data collected by the first web site.

16. The method of claim 12, wherein the pre-existing user data is maintained by the first entity.

17. The method of claim 12, wherein the payment instrument is a credit card.

18. The method of claim 12, wherein programmatically determining an amount to charge the second entity comprises selecting between multiple non-zero payment amounts, each of which is associated with different user criteria.

19. The method of claim 12, further comprising programmatically determining a payment amount to pay the first entity in connection with the ad selection event such that the payment amount is dependent upon said user data associated with the user computer.

20. A computer-implemented method, comprising:
by an ad placement system that comprises one or more computers:
maintaining, in a data repository of said ad placement system, user account data reflective of user accounts created by users, said user account data including data that associates particular user accounts with particular user computers;
receiving, at a server of said ad placement system, a request message generated by a web browser running on a user computer, said request message generated in response to an ad selection event in which a user selects an ad presented on a web page of a web site of a first entity to access a web page associated with an advertiser; and
programmatically determining whether to charge the advertiser a pay-per-click fee for the ad selection event based, at least in part, on whether the user computer is associated with a user account created prior to the ad selection event, as determined from said user account data stored in said data repository, wherein programmatically determining whether to charge the advertiser a pay-per-click fee comprises using a browser cookie received by the server from the user computer to determine whether a payment instrument is on file for said user account;
wherein the ad placement system is operated by a service provider entity that is different from the first entity and the advertiser, said ad placement system including said server, said request message being sent to the second entity by the service provider entity.

21. The method of claim 20, further comprising, in response to receiving the request message, redirecting the web browser to the web page associated with the advertiser.

22. The method of claim 20, wherein the ad placement system serves ads for display on a plurality of ad publishing sites, and the web site is one of the ad publishing sites.

23. The method of claim 20, wherein the payment instrument is a credit card.

24. The method of claim 23, wherein the method further comprises the ad placement system calculating an amount of the pay-per-click fee based at least partly on user account data associated with the user account.

25. The method of claim 20, wherein the step of determining whether to charge the advertiser a fee is based, at least in part, on information received by said server from a server of the web site.

26. The method of claim 20, wherein the step of determining whether to charge the advertiser a fee is based, at least in part, on user account information collected by the web site.

27. A computer system, comprising:
a computer data repository that stores user account information in association with particular user computing devices; and
a server system that accesses said computer data repository, said server system programmed to perform a method that comprises:
receiving a request message generated by a web browser running on a user computing device, said request message generated in response to an ad selection event in which a user selects an ad presented on a web page of a web site of a first entity to access a web page associated with an advertiser; and
programmatically determining whether to charge the advertiser a fee for the ad selection event based, at least in part, on whether the user computing device is associated with a user account for which a payment instrument is on file, as determined by using a browser cookie received from the user computing device to look up associated user account information stored in the computer data repository;
wherein the computer system is separate from the web site of the first entity and the web page associated with the advertiser.

28. A computer system, comprising:
a computer data repository that stores user account information, including credit card information, in association with particular user computing devices; and
a server system that accesses said computer data repository, said server system programmed to perform a method that comprises:
receiving a request message generated by a web browser running on a user computing device, said request message generated in response to an ad selection event in which a user selects an ad presented on a web page of a first web site of a first entity to access a second web site of a second entity, said second web site being a target of the ad; and programmatically determining whether to charge the second entity a fee for the ad selection event based, at least in part, on whether the user computing device is associated with a user account for which a payment instrument is on file, as determined using information stored in said computer data repository prior to the ad selection event, wherein programmatically determining whether to charge the second entity said fee comprises using a browser cookie received from the user computing device to look up associated user account information from the computer data repository.

29. The computer system of claim 28, wherein the method further comprises determining an amount to charge the second entity in connection with the ad selection event such that the amount is dependent upon the user account information.

30. The method of claim 12, wherein the pre-existing user data is maintained by the service provider entity.

* * * * *

UNITED STATES PATENT AND TRADEMARK OFFICE
CERTIFICATE OF CORRECTION

| | | |
|---|---|---|
| PATENT NO. | : 7,734,502 B1 | |
| APPLICATION NO. | : 11/201749 | |
| DATED | : June 8, 2010 | |
| INVENTOR(S) | : Tamar Yehoshua et al. | |

It is certified that error appears in the above-identified patent and that said Letters Patent is hereby corrected as shown below:

At Column 12, Line 16 (approx.), In Claim 5, after "wherein" insert --the--.

Signed and Sealed this
Eighteenth Day of January, 2011

David J. Kappos
*Director of the United States Patent and Trademark Office*